(12) United States Patent
Brodlo

(10) Patent No.: US 6,224,141 B1
(45) Date of Patent: May 1, 2001

(54) TRAILER SIDE WIND DEFLECTING SYSTEM

(76) Inventor: Steve A. Brodlo, 560 N. Jerome, North Lake, IL (US) 60164

( * ) Notice: Subject to any disclaimer, the term of this patent is extended or adjusted under 35 U.S.C. 154(b) by 0 days.

(21) Appl. No.: 09/345,853

(22) Filed: Jul. 1, 1999

(51) Int. Cl.[7] .................................................. B62D 37/02
(52) U.S. Cl. ................................... 296/180.2; 296/180.1; 296/180.4
(58) Field of Search ............................. 296/180.1, 180.2, 296/180.4

(56) References Cited

U.S. PATENT DOCUMENTS

| | | | |
|---|---|---|---|
| 3,866,967 | * | 2/1975 | Landry et al. ................. 296/180.1 X |
| 3,904,236 | * | 9/1975 | Johnson et al. ............... 296/180.1 X |
| 3,999,796 | * | 12/1976 | Greene, Sr. et al. ......... 296/180.1 X |
| 4,103,957 | * | 8/1978 | Landry et al. ................. 296/180.1 X |
| 4,131,309 | * | 12/1978 | Henke ............................ 296/180.1 X |
| 4,421,354 | * | 12/1983 | Lemaster ....................... 296/180.1 X |
| 4,518,188 | * | 5/1985 | Witten ........................... 296/180.1 X |

* cited by examiner

Primary Examiner—Joseph D. Pape
Assistant Examiner—Lori L. Coletta

(57) ABSTRACT

A trailer side wind deflecting system for preventing trailers from overturning from strong side wind gusts. The trailer side wind deflecting system includes top and bottom panels each having inner and outer faces, top and bottom edges. The bottom edge of the top panel is coupled to the top edge of the bottom panel. The top edge of the top panel is designed for mounting to an associated adjacent side wall of a trailer adjacent a top wall of the trailer such that the top and bottom panels depend therefrom. The top and bottom panels lie in planes extending at an obtuse angle to one another to define an outer vertex along the coupled edges of the panels so that the top and bottom panels form a wedge for outwardly extending from the associated adjacent side wall of the trailer to deflect gusts of wind blowing against the side wall in upwards and downwards directions.

12 Claims, 2 Drawing Sheets

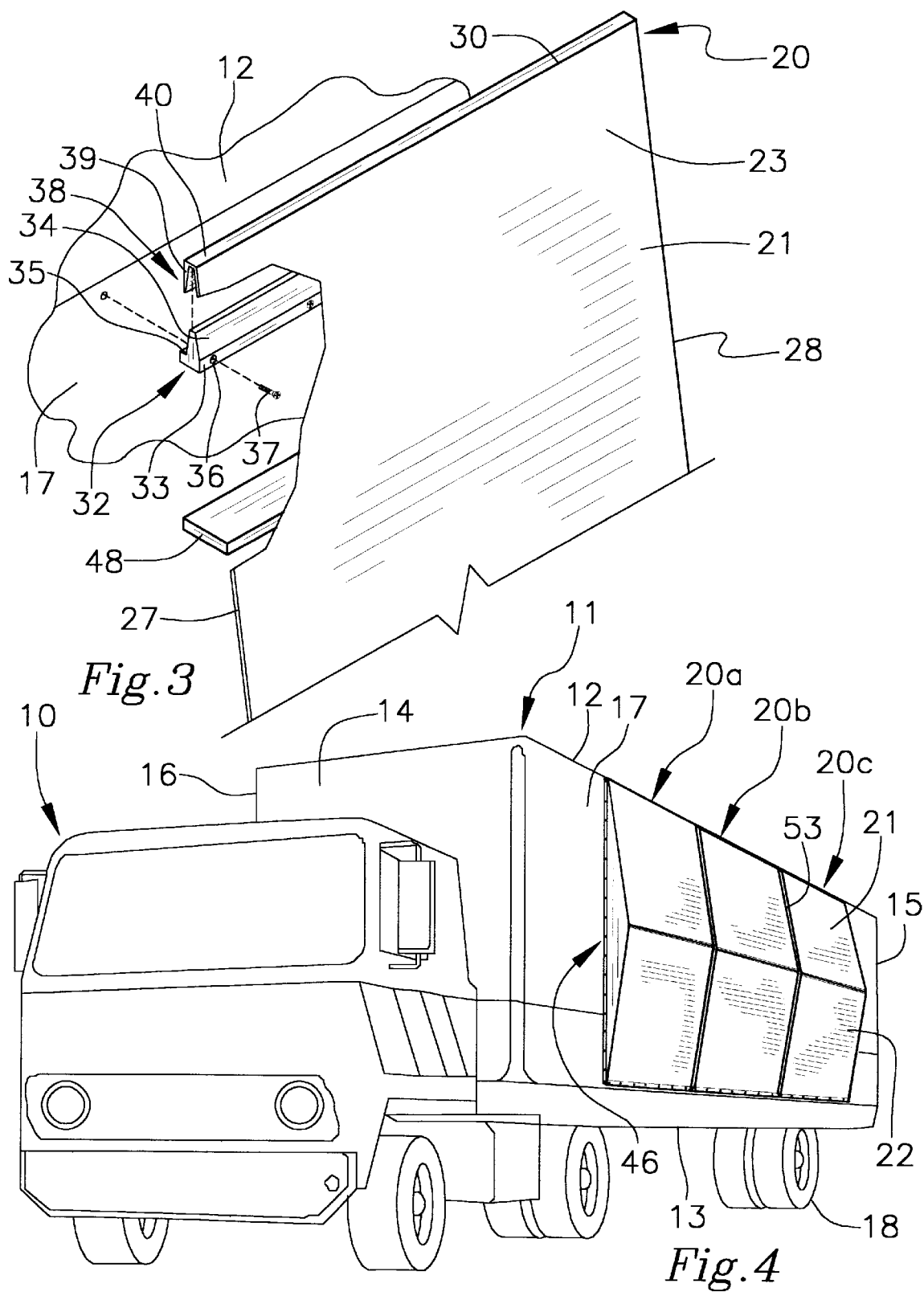

TRAILER SIDE WIND DEFLECTING SYSTEM

BACKGROUND OF THE INVENTION

1. Field of the Invention

The present invention relates to systems for preventing trailers from overturning from strong side wind gusts and more particularly pertains to a new trailer side wind deflecting system for preventing trailers from overturning from strong side wind gusts.

2. Description of the Prior Art

The use of systems for preventing trailers from overturning from strong side wind gusts is known in the prior art. More specifically, systems for preventing trailers from overturning from strong side wind gusts heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,904,236; U.S. Pat. No. 4,966,407; U.S. Pat. No. 5,579,794; U.S. Pat. No. 3,054,151; U.S. Pat. No. 4,897,970; and U.S. Pat. No. 3,949,527.

While these devices fulfill their respective, particular objectives and requirements, the aforementioned patents do not disclose a new trailer side wind deflecting system. The inventive device includes top and bottom panels each having inner and outer faces, top and bottom edges. The bottom edge of the top panel is coupled to the top edge of the bottom panel. The top edge of the top panel is designed for mounting to an associated adjacent side wall of a trailer adjacent a top wall of the trailer such that the top and bottom panels depend therefrom. The top and bottom panels lie in planes extending at an obtuse angle to one another to define an outer vertex along the coupled edges of the panels so that the top and bottom panels form a wedge for outwardly extending from the associated adjacent side wall of the trailer to deflect gusts of wind blowing against the side wall in upwards and downwards directions.

In these respects, the trailer side wind deflecting system according to the present invention substantially departs from the conventional concepts and designs of the prior art, and in so doing provides an apparatus primarily developed for the purpose of preventing trailers from overturning from strong side wind gusts.

SUMMARY OF THE INVENTION

In view of the foregoing disadvantages inherent in the known types of systems for preventing trailers from overturning from strong side wind gusts now present in the prior art, the present invention provides a new trailer side wind deflecting system construction wherein the same can be utilized for preventing trailers from overturning from strong side wind gusts.

The general purpose of the present invention, which will be described subsequently in greater detail, is to provide a new trailer side wind deflecting system apparatus and method which has many of the advantages of the systems for preventing trailers from overturning from strong side wind gusts mentioned heretofore and many novel features that result in a new trailer side wind deflecting system which is not anticipated, rendered obvious, suggested, or even implied by any of the prior art systems for preventing trailers from overturning from strong side wind gusts, either alone or in any combination thereof.

To attain this, the present invention generally comprises top and bottom panels each having inner and outer faces, top and bottom edges. The bottom edge of the top panel is coupled to the top edge of the bottom panel. The top edge of the top panel is designed for mounting to an associated adjacent side wall of a trailer adjacent a top wall of the trailer such that the top and bottom panels depend therefrom. The top and bottom panels lie in planes extending at an obtuse angle to one another to define an outer vertex along the coupled edges of the panels so that the top and bottom panels form a wedge for outwardly extending from the associated adjacent side wall of the trailer to deflect gusts of wind blowing against the side wall in upwards and downwards directions.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new trailer side wind deflecting system apparatus and method which has many of the advantages of the systems for preventing trailers from overturning from strong side wind gusts mentioned heretofore and many novel features that result in a new trailer side wind deflecting system which is not anticipated, rendered obvious, suggested, or even implied by any of the prior art systems for preventing trailers from overturning from strong side wind gusts, either alone or in any combination thereof.

It is another object of the present invention to provide a new trailer side wind deflecting system which may be easily and efficiently manufactured and marketed.

It is a further object of the present invention to provide a new trailer side wind deflecting system which is of a durable and reliable construction.

An even further object of the present invention is to provide a new trailer side wind deflecting system which is susceptible of a low cost of manufacture with regard to both materials and labor, and which accordingly is then susceptible of low prices of sale to the consuming public, thereby making such trailer side wind deflecting system economically available to the buying public.

Still yet another object of the present invention is to provide a new trailer side wind deflecting system which provides in the apparatuses and methods of the prior art some of the advantages thereof, while simultaneously overcoming some of the disadvantages normally associated therewith.

Still another object of the present invention is to provide a new trailer side wind deflecting system for preventing trailers from overturning from strong side wind gusts.

Yet another object of the present invention is to provide a new trailer side wind deflecting system which includes top and bottom panels each having inner and outer faces, top and bottom edges. The bottom edge of the top panel is coupled to the top edge of the bottom panel. The top edge of the top panel is designed for mounting to an associated adjacent side wall of a trailer adjacent a top wall of the trailer such that the top and bottom panels depend therefrom. The top and bottom panels lie in planes extending at an obtuse angle to one another to define an outer vertex along the coupled edges of the panels so that the top and bottom panels form a wedge for outwardly extending from the associated adjacent side wall of the trailer to deflect gusts of wind blowing against the side wall in upwards and downwards directions.

Still yet another object of the present invention is to provide a new trailer side wind deflecting system that is easy to install along the side of a trailer.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic breakaway partial perspective view of the present invention.

FIG. 4 is a schematic perspective view of the present invention in use on a trailer.

DESCRIPTION OF THE PREFERRED EMBODIMENT

Figures 1, 2:
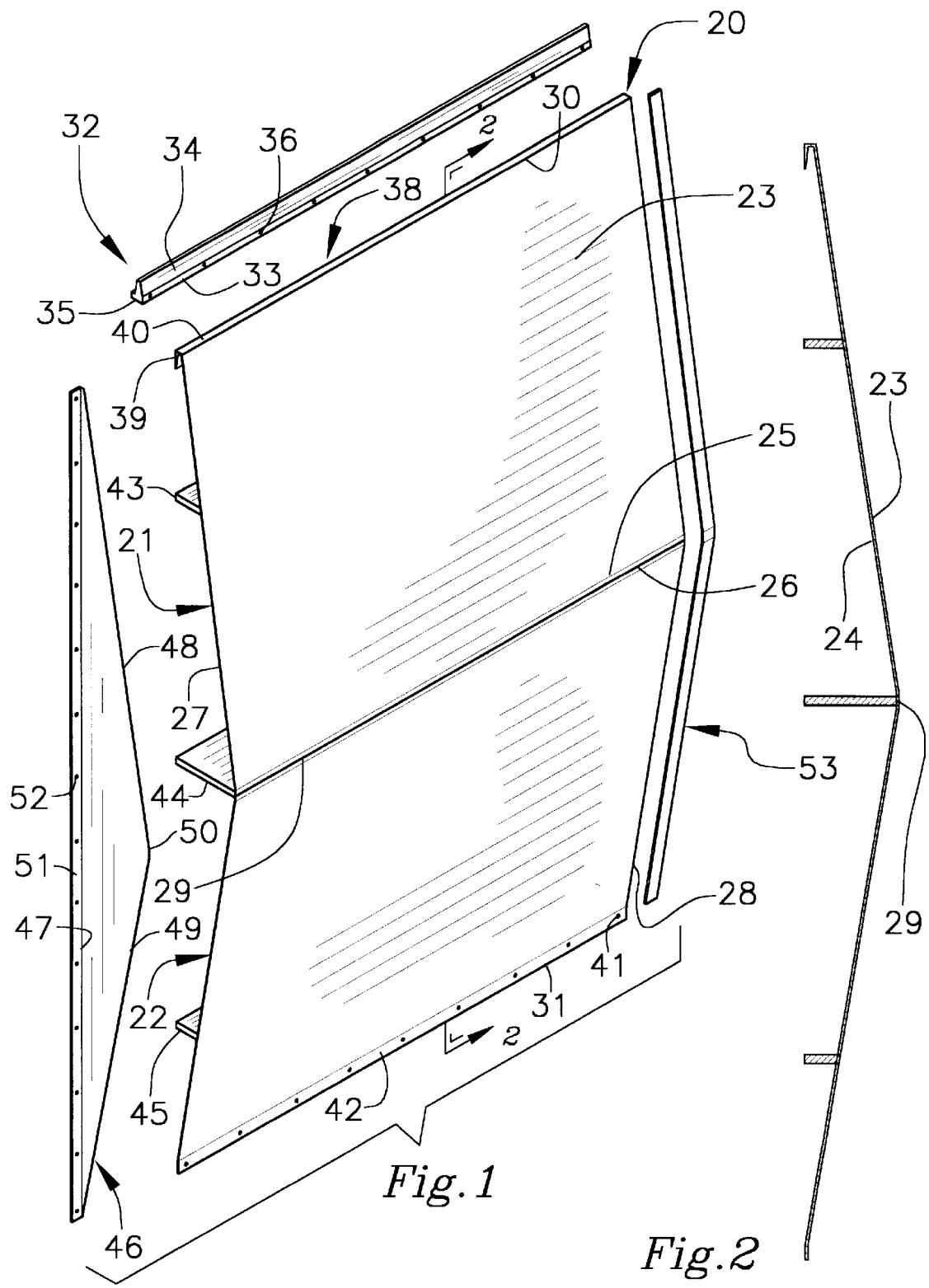
FIG. 1 is a schematic exploded perspective view of elements of a new trailer side wind deflecting system according to the present invention.
FIG. 2 is a schematic side view of the present invention.

With reference now to the drawings, and in particular to FIGS. 1 through 4 thereof, a new trailer side wind deflecting system embodying the principles and concepts of the present invention will be described.

As best illustrated in FIGS. 1 through 4, the trailer side wind deflecting system generally comprises top and bottom panels each having inner and outer faces, top and bottom edges. The bottom edge of the top panel is coupled to the top edge of the bottom panel. The top edge of the top panel is designed for mounting to an associated adjacent side wall of a trailer adjacent a top wall of the trailer such that the top and bottom panels depend therefrom. The top and bottom panels lie in planes extending at an obtuse angle to one another to define an outer vertex along the coupled edges of the panels so that the top and bottom panels form a wedge for outwardly extending from the associated adjacent side wall of the trailer to deflect gusts of wind blowing against the side wall in upwards and downwards directions.

In use, the wind deflecting system is designed for use on a rig comprising a semi-tractor 10 and a trailer 11 designed for being towed by the semi-tractor. The trailer has substantially horizontal top and bottom walls 12, 13, substantially vertical front and back walls 14, 15, and a pair of substantially vertical side walls 16, 17 extending between the front and back walls of the trailer. The bottom wall of the trailer has a plurality of ground engaging wheels 18 and the front wall has a kingpin for hitching to a fifth wheel hitch of the semi-tractor.

In this system, each side wall of the trailer has a plurality of wind deflectors 20a, 20b, 20c mounted thereto. As illustrated in FIG. 4, the wind deflectors are arranged in a row extending along associated adjacent side wall between the front and back walls of the trailer.

With particular reference to FIG. 1, each wind deflector 20 comprises substantially planar top and bottom panels 21, 22 each having substantially planar inner and outer faces 23, 24 and a generally rectangular outer perimeter comprising substantially straight top and bottom edges and substantially straight first and second side edges extending between the top and bottom edges of the respective panel.

The bottom edge 25 of the top panel is coupled to the top edge 26 of the bottom panel. The first side edges 27 of the panels lie in a common vertical plane with each other and the second side edges of 28 the panels lie in a common vertical plane with each other.

As best illustrated in FIG. 2, the top and bottom panels lie in planes extending at an obtuse angle to one another to define an outer vertex 29 along the coupled edges of the panels. This way, the top and bottom panels form a wedge outwardly extending from the associated adjacent side wall of the trailer (as shown in FIG. 4) to deflect gusts of wind blowing against the side wall in upwards and downwards directions.

The top edge 30 of the top panel is mounted to the side wall adjacently along the top wall of the trailer such that the top and bottom panels depend therefrom along a portion of the associated adjacent side wall of the trailer. In one embodiment, the bottom edge 31 of the bottom panel is positioned towards the bottom wall of the trailer.

Each wind deflector may further comprise a horizontally extending elongate hanging rail 32 coupled to the associated side wall of the trailer adjacent the top wall of the trailer. The hanging rail has a bottom mounting portion 33, an upper hanging portion 34 upwardly extending from the bottom mounting portion, and an inwards shoulder 35. In one embodiment, the upper hanging portion of the hanging rail may have a generally triangular transverse cross section.

The bottom mounting portion has a plurality of mounting holes 36 extending therethrough through which fasteners 37 may be extended through and into the associated adjacent side wall of the trailer to couple the hanging rail to the trailer. The inwards shoulder of the hanging rail is positioned adjacent the associated adjacent side wall of the trailer so that the upper hanging portion of the hanging rail is spaced apart from the associated adjacent side wall of the trailer.

In such an embodiment of the wind deflector, the top panel has an inner hanging lip 38 extending along the top edge of the top panel and outwardly extending from the inner face of the top panel. The inner hanging lip of the top panel may have a generally inverted-L-shaped transverse cross section and comprise an inner portion 39 spaced apart from the inner face of the top panel and an upper portion 40 connecting the inner portion of the inner hanging lip to the top edge of the top panel.

The inner portion of the inner hanging lip is inserted between the associated side wall of the trailer and the upper hanging portion of the hanging rail and the upper portion of the inner hanging lip resting on the upper hanging portion of the hanging rail to mount the top edge of the top panel to the associated adjacent side wall of the trailer.

The bottom edge of the bottom panel may be coupled to associated adjacent side wall of the trailer. In one such embodiment, the bottom panel has a plurality of spaced apart securing holes 41 therethrough arranged in a row extending along the bottom edge bottom panel. Each securing hole has a fastener (like the fasteners securing the hanging rail) extended therethrough into the associated adjacent side wall of the trailer to couple the bottom edge of the bottom panel to associated adjacent side wall of the trailer. The securing holes of the bottom panel may be located in a bottom strip 42 of the bottom panel extending along the bottom edge of the bottom panel and lie in a plane extending outwardly from the outer face of the bottom panel at an obtuse angle.

Each wind deflector may further comprise a plurality of substantially horizontal elongate spacers extending between the side edges of the panels and outwardly extending from the inner faces of the panel to abut the associated adjacent side wall. The plurality of spacers may include top, middle and bottom spacers extending substantially parallel to one another. The top spacer 43 is coupled to the inner face of the top panel. The middle spacer 44 is coupled to an inwards side of the outer vertex defined by the bottom edge of the top panel and the top edge of the bottom panel. The bottom spacer 45 is coupled to the inner face of the bottom panel.

The system may also include at least one generally triangular end panel 46 having an inner edge 47 and top and bottom outer edges 48, 49 converging together to form an outwards vertex 50. The inner edge of the end panel has a mounting flange 51 extending therealong substantially perpendicular to the end panel. The mounting flange of the end panel has a plurality of coupling holes 52 for extending fasteners therethrough to couple the mounting flange of the end panel to the associated adjacent side wall such that the end panel outwardly extends from the associated adjacent side wall.

As best illustrated in FIG. 4, the end panel abuts the first side edges of the top and bottom panels of a front most located one of the wind deflectors. The outwards vertex of the end panel is aligned with the outer vertex of the front most located one of the wind deflectors.

Each adjacent pair of wind deflectors may also have an elongate joint covering strip 53 extending along the adjacent side edges of the adjacent pair of wind deflectors, the joint covering strip is coupled to the outer faces of the panels of the adjacent pair of wind deflectors.

In one illustrative embodiment, each wind deflector may have a height defined between the top edge of the top panel and the bottom edge of the bottom panel of about 8 feet. In this illustrative embodiment, the middle spacer of each wind deflector may have a width of about 8 inches such that the outer vertex of the wind deflector is spaced about 8 inches away from the associated adjacent side wall of the trailer.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wind deflector for mounting to an associated adjacent side of a trailer, comprising:

top and bottom panels each having inner and outer faces, top and bottom edges;

said bottom edge of said top panel being coupled to said top edge of said bottom panel;

said top edge of said top panel being adapted for mounting to an associated adjacent side wall of a trailer adjacent a top wall of the trailer such that said top and bottom panels depend therefrom;

said top and bottom panels lying in planes extending at an obtuse angle to one another to define an outer vertex along said coupled edges of said panels such that said top and bottom panels form a wedge for outwardly extending from the associated adjacent side wall of the trailer to deflect gusts of wind blowing against the side wall in upwards and downwards directions; and an elongate hanging rail adapted for coupling to the associated side wall of the trailer adjacent the top wall of the trailer, said top panel having an inner hanging lip extending along said top edge of said top panel and outwardly extending from said inner face of said top panel, said inner hanging lip being hung on said hanging rail to mount said panels to the associated side wall.

2. The wind deflector of claim 1, wherein said panels each have first and second side edges extending between said top and bottom edges of the respective panel, said first side edges of said panels lying in a common plane with each other, said second side edges of said panels lying in a common plane with each other.

3. The wind deflector of claim 1, wherein said hanging rail has a bottom mounting portion, an upper hanging portion upwardly extending from said bottom mounting portion, and an inwards shoulder, said bottom mounting portion being coupled to the associated adjacent side wall of the trailer, said inwards shoulder of said hanging rail being positioned adjacent the associated adjacent side wall of the trailer such that said upper hanging portion of said hanging rail is spaced apart from the associated adjacent side wall of the trailer.

4. The wind deflector of claim 3, wherein said inner hanging lip of said top panel has a generally inverted-L- shaped transverse cross section and comprises an inner portion spaced apart from said inner face of said top panel and an upper portion connecting said inner portion of said inner hanging lip to said top edge of said top panel, said inner portion of said inner hanging lip being inserted between the associated side wall of said trailer and said upper hanging portion of said hanging rail and said upper portion of said inner hanging lip resting on said upper hanging portion of said hanging rail to mount said top edge of said top panel to the associated adjacent side wall of said trailer.

5. The wind deflector of claim 1, wherein said bottom panel has a plurality of spaced apart securing holes therethrough arranged in a row extending along said bottom edge of said bottom panel.

6. A wind deflecting system, comprising:

a trailer adapted for being towed by a semi-tractor, said trailer having substantially horizontal top and bottom walls, substantially vertical front and back walls, and a pair of substantially vertical side walls extending between said front and back walls of said trailer;

each side wall of said trailer having a plurality of wind deflectors mounted thereto, said wind deflectors arranged in a row extending along associated adjacent side wall between said front and back walls of said trailer;

each wind deflector comprising substantially planar top and bottom panels each having substantially planar inner and outer faces and a generally rectangular outer perimeter comprising substantially straight top and bottom edges and substantially straight first and second side edges extending between said top and bottom edges of the respective panel;

said bottom edge of said top panel being coupled to said top edge of said bottom panel, said first side edges of said panels lying in a common vertical plane with each other, said second side edges of said panels lying in a common vertical plane with each other;

said top and bottom panels lying in planes extending at an obtuse angle to one another to define an outer vertex along said coupled edges of said panels such that said top and bottom panels form a wedge outwardly extending from the associated adjacent side wall of said trailer to deflect gusts of wind blowing against the side wall in upwards and downwards directions;

said top edge of said top panel being mounted to said side wall adjacently along said top wall of said trailer such that said top and bottom panels depend therefrom along a portion of the associated adjacent side wall of said trailer and such that said bottom edge of said bottom panel is positioned towards said bottom wall of said trailer;

each wind deflector further comprising a horizontally extending elongate hanging rail coupled to the associated side wall of said trailer adjacent said top wall of said trailer;

said hanging rail having a bottom mounting portion, an upper hanging portion upwardly extending from said bottom mounting portion, and an inwards shoulder;

said bottom mounting portion having a plurality of mounting holes extending therethrough, each mounting hole having a fastener extended therethrough and into the associated adjacent side wall of said trailer;

said inwards shoulder of said hanging rail being positioned adjacent the associated adjacent side wall of said trailer such that said upper hanging portion of said hanging rail is spaced apart from the associated adjacent side wall of said trailer;

said top panel having an inner hanging lip extending along said top edge of said top panel and outwardly extending from said inner face of said top panel;

said inner hanging lip of said top panel having a generally inverted-L-shaped transverse cross section and comprising an inner portion spaced apart from said inner face of said top panel and an upper portion connecting said inner portion of said inner hanging lip to said top edge of said top panel;

said inner portion of said inner hanging lip being inserted between the associated side wall of said trailer and said upper hanging portion of said hanging rail and said upper portion of said inner hanging lip resting on said upper hanging portion of said hanging rail to mount said top edge of said top panel to the associated adjacent side wall of said trailer;

said bottom edge of said bottom panel being coupled to associated adjacent side wall of said trailer;

said bottom panel having a plurality of spaced apart securing holes therethrough arranged in a row extending along said bottom edge bottom panel;

each securing hole having a fastener extended therethrough into the associated adjacent side wall of said trailer to couple said bottom edge of said bottom panel to associated adjacent side wall of said trailer each wind deflector further comprising a plurality of substantially horizontal elongate spacers extending between said side edges of said panels and outwardly extending from said inner faces of said panel to abut the associated adjacent side wall;

said plurality of spacers including top, middle and bottom spacers extending substantially parallel to one another;

said top spacer being coupled to said inner face of said top panel;

said middle spacer being coupled to an inwards side of said outer vertex defined by said bottom edge of said top panel and said top edge of said bottom panel; and said bottom spacer being coupled to said inner face of said bottom panel.

7. A wind deflector for mounting to an associated adjacent side of a trailer, comprising:

top and bottom panels each having inner and outer faces, top and bottom edges;

said bottom edge of said top panel being coupled to said top edge of said bottom panel;

said top edge of said top panel being adapted for mounting to an associated adjacent side wall of a trailer adjacent a top wall of the trailer such that said top and bottom panels depend therefrom;

said top and bottom panels lying in planes extending at an obtuse angle to one another to define an outer vertex along said coupled edges of said panels such that said top and bottom panels form a wedge for outwardly extending from the associated adjacent side wall of the trailer to deflect gusts of wind blowing against the side wall in upwards and downwards directions; and a plurality of elongate spacers extending between said side edges of said panels and outwardly extending from said inner faces of said panel to abut the associated adjacent side wall.

8. The wind deflector of claim 7, wherein said plurality of spacers including top, middle and bottom spacers extending substantially parallel to one another, said top spacer being coupled to said inner face of said top panel, said middle spacer being coupled to an inwards side of said outer vertex defined by said bottom edge of said top panel and said top edge of said bottom panel, and said bottom spacer being coupled to said inner face of said bottom panel.

9. The wind deflector of claim 7, wherein said panels each have first and second side edges extending between said top and bottom edges of the respective panel, said first side edges of said panels lying in a common plane with each other, said second side edges of said panels lying in a common plane with each other.

10. The wind deflector of claim 7, wherein said hanging rail has a bottom mounting portion, an upper hanging portion upwardly extending from said bottom mounting portion, and an inwards shoulder, said bottom mounting portion being coupled to the associated adjacent side wall of the trailer, said inwards shoulder of said hanging rail being positioned adjacent the associated adjacent side wall of the trailer such that said upper hanging portion of said hanging rail is spaced apart from the associated adjacent side wall of the trailer.

11. The wind deflector of claim 7, wherein said inner hanging lip of said top panel has a generally inverted-L-shaped transverse cross section and comprises an inner portion spaced apart from said inner face of said top panel and an upper portion connecting said inner portion of said inner hanging lip to said top edge of said top panel, said inner portion of said inner hanging lip being inserted between the associated side wall of said trailer and said upper hanging portion of said hanging rail and said upper portion of said inner hanging lip resting on said upper hanging portion of said hanging rail to mount said top edge of said top panel to the associated adjacent side wall of said trailer.

12. The wind deflector of claim 7, wherein said bottom panel has a plurality of spaced apart securing holes there through arranged in a row extending along said bottom edge of said bottom panel.

\* \* \* \* \*